Figure 1:
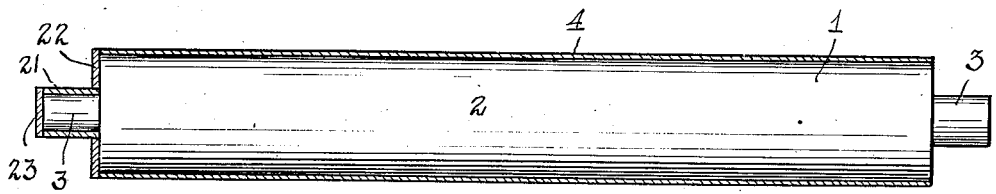

June 13, 1939.   C. G. WATSON   2,161,905
METAL COATED ROLLER
Filed May 6, 1936

INVENTOR.
Charles G. Watson
BY Fay, Oberlin & Fay
ATTORNEYS.

Patented June 13, 1939

2,161,905

UNITED STATES PATENT OFFICE 2,161,905

METAL COATED ROLLER

Charles G. Watson, Youngstown, Ohio

Application May 6, 1936, Serial No. 78,139

2 Claims. (Cl. 29—182)

My invention relates to improvements in shafts or rollers, formed of base metal, and having a substantially integral outside layer having particular qualities and characteristics, and to improvements in methods of making same.

For many purposes it is desired to use shafts or rollers with an outside or working surface of metal having noncorrossive, or other particular characteristics. Quite uniformly metals having such characteristics are of high price and often they are of a nature which makes it difficult and expensive to form a shaft or roller entirely of such metal due to the difficulty of working same into the desired shape.

In forming a shaft or roller according to my invention I prepare of base metal, such as steel or cast iron, a shaft or roller of the shape desired and then bring to the full desired size by applying a layer of metal which constitutes the working surface. The metal so forming the outside layer will be one which has the qualities and characteristics desired in such working surface.

For example, I have made a shaft roller for use in a Fourdrinier mill, which roller comprises a body portion, including end bearings, of steel, and having about the body portion, providing a working surface for the roller, a substantial layer of nickel compressed into such close relation with the body of the roll that it is immovable relative thereto. Such a roller has in use all of the properties of a nickel roller and may be prepared at a fraction of the cost of preparing a roller composed entirely of nickel or of any other metal having the desired characteristics.

To the accomplishment of the foregoing and related ends, said invention, then, consists of the means hereinafter fully described and particularly pointed out in the claims.

The following description and annexed drawing sets forth in detail one method and one product exemplifying my invention, such disclosed procedure and product constituting, however, but one of various applications of the principles of my invention.

Figure 2:
Figure 3:
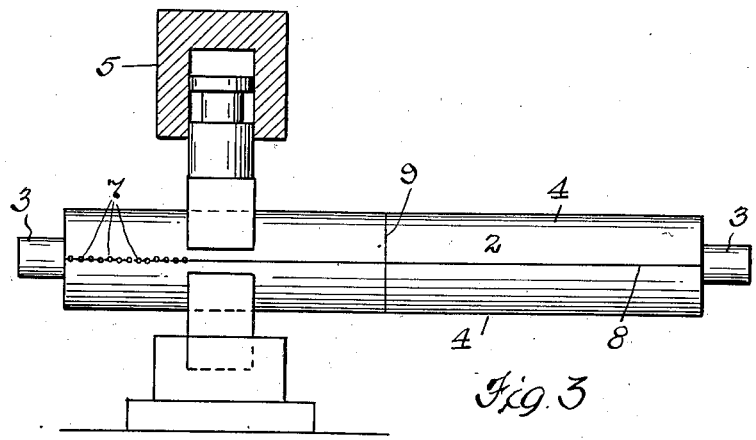
Figure 4:
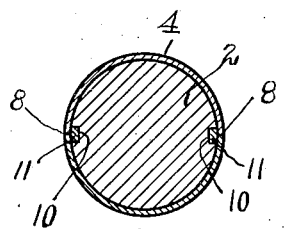
Figure 5:
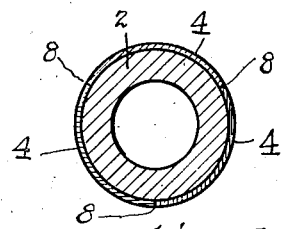

In the drawing:

Fig. 1 shows a cross-sectional view of a roller constructed as taught herein; Fig. 2 is an elevational view of a sheet of nickel prepared for affixing on a roller; Fig. 3 is an elevational view of a roller assembled and held in a press for welding; Fig. 4 is a cross-sectional view of a roller of one type of my invention; and Fig. 5 is a cross-sectional view of such a roller of another type.

Referring to the drawing, a body portion 1 of a shaft or roller 2 is composed of steel which has been cast or otherwise formed in the shape desired. Said body portion 1 has bearing portions 3 integral therewith. About the circumferential surface of the main body which is the portion exposed to use in operations is a continuous sheet 4 of nickel of substantial thickness. Said sheet of nickel is in such intimate compressed relation with the steel of the body portion 1 that it may not be moved relative thereto without destroying same. Shafts, or rollers, similar to the one shown in Figs. 1 and 3 are adapted for use in Fourdrinier mills, glass lehrs and in a variety of construction where it would be exposed on its working surface to the destructive effects of chemicals, or where such surface might itself, if formed of steel or other unsuitable metal, have an injurious effect upon the material being worked.

In forming such a shaft or roller, I turn down or otherwise finish the working surface after the shaft or roller has been cast or otherwise formed of the approximate size desired in the finished article. As a result of this finishing operation the working surface is such that, when a sheet of nickel or other metal of the desired thickness is applied thereto, the finished roller will be of the exact dimensions desired in use.

From metal sheets of the desired thickness portions are cut and so shaped that when placed with edges together they form a cylinder having on the inside the same diameter as was left in the roller after it was turned down or otherwise finished. These semi-cylindrical sheets 4 are assembled about the prepared body 2 and the assembly placed in the jaws of a hydraulic press 5, or similar device. The jaws of the press which receive the assembly are formed to the dimensions desired in the finished article. Extreme pressure is then applied to the jaws forcing the cylindrical sheets into intimate contact with the roller surface. The meeting edges 6 of the cylindrical shells are spot welded together in the seams and the assembly is advanced across the jaws of the press that successive sections may be compressed and spot-welded. When successive spot welds 7 hold the entire length of the shells together, the seams 8 are each completely welded throughout their length. The weld metal, as it cools, draws the sheets into contact with the body of the roller closer than that resulting from the compressing force applied.

It readily appears that the sheets may be applied in multiple with abutting edges 9, which may be welded. It is important that the longitudinal seams be secured by welding while the assembled parts are under compression in the press 5.

When affixing sheets of metal, as taught herein, on a hollow shaft, or a tubing, it is desirable to keep such shaft or tubing cool, as by flowing water therethrough. Also it may be advantageous in some cases to weld the seams 8 continuously while in the press instead of spot welding therein and completing in a subsequent operation.

When it is desired that the metal of the weld seam be entirely free of contamination from the metal of the body portion of the roller, grooves 10 may be cut longitudinally in the body portion, which grooves will be so disposed that they will be located beneath the adjoining edges of the sheets forming the surface layer. In these grooves strips 11 of suitable metal, preferably that of the surface layer, will be placed and the sheets 4 will be so placed that their abutting edges will form a seam 8 over said strips 11. The assembly is then compressed as above explained and the edges of the sheets are welded to each other and to the underlying strips 11, in the manner hereinabove set forth. On cooling, the metal melted in forming the welded seam will contract and the tension of such contraction will draw the sheets into contact with the body portion closer than that resulting from the compressive force of the press 5. Seams so formed will be uncontaminated by the metal of the roller body.

While I have indicated herein a preference for a hydraulic press as a means of applying the pressure needed to force the surface sheets into intimate contact with the body of the roller, it is within the scope of my invention to weld the seams while passing the assembly continuously between grooved compression rollers.

Also, as indicated, the shaft or other article to be clad with a special metal as taught herein may be tubular if desired, and the method of my invention may be used in applying sheets of metal other than nickel to shafts of metal other than iron. Stainless steel and Monel metal are particularly adapted for use in making non-corrosive shafts. Also it is apparent that the strips 11 placed in the grooves 10 need not be of the same metal as that of the applied sheets. For example, strips of Monel metal may be used in the grooves when sheets of nickel are being applied to a steel shaft.

In some applications it may be desirable to have the weld seams run diagonally or out of parallel with the axis of the shaft. It is not essential that two seams be diametrically disposed and accordingly one of the applied sheets may be larger than the other, or three or more sheets may be used to cover the circumferential surface of a roller or shaft.

In the practice of my invention it is essential that welds, uniting the sheets into an integral covering, be formed, while the said sheets are compressed about the body member, sufficient to exert, on cooling, the tension desired to draw said integral covering into intimate relation with said body member. The well understood contraction of weld metal is used in my invention in a novel relation for securing a novel metal clad article having a wide variety of uses, since it has the desired characteristics of old articles which can be produced only at substantially greater cost.

When desired, my invention may be used to completely cover the surface of a roller or the like. Referring to Fig. 1, the left-hand end of the roller shown in cross-section illustrates the means of so covering. After applying the surface covering 4 as explained, a covering member 21 may be similarly applied to the bearing 3. Then a washer-shaped member 22 is fitted about the said bearing 3 and welded to the coverings 4 and 21. Then a circular member 23 is fitted on the end of the bearing 3 and welded to the covering 21. These members 21, 22 and 23 will preferably be of material similar to that of the roller covering 4, but may be of other sheet metal having desired characteristics.

Similarly, limited areas of the surface of a roller or shaft may be covered as taught herein and the uncovered portion may be coated with other material, such as rubber or other non-metallic covering.

Other modes of applying the principle of my invention may be employed instead of the one explained, change being made as regards the product and method herein disclosed, provided the step or steps stated by any of the following claims or the equivalent of such stated step or steps be employed.

I therefore particularly point out and distinctly claim as my invention:

1. An article of manufacture as described comprising a body of metal in cylindrical form, and a sheet of metal mounted circumferentially of said body covering an axial length thereof and uniformly in intimate contact therewith; said covering sheet being characterized by a plurality of seams of weld metal therein, formed axially of said body, and so disposed that the cooling contraction of the weld metal in said seams draws oppositely on the portion of said sheet between two of said seams whereby such portion is held in intimate contact with said roll.

2. An article of manufacture as described comprising a body of metal in cylindrical form, and a sheet of metal mounted circumferentially of said body covering an axial length thereof and uniformly in intimate contact therewith; said covering sheet being characterized by a plurality of seams of weld metal therein, formed axially of said body, and by a tension in said sheet, which tension is maintained in said sheet between two seams by the cooling contraction of the metal in said seams.

CHARLES G. WATSON.